United States Patent
Wagner et al.

(10) Patent No.: US 9,268,625 B1
(45) Date of Patent: Feb. 23, 2016

(54) SYSTEM AND METHOD FOR STORAGE MANAGEMENT

(71) Applicant: EMC Corporation, Hopkinton, MA (US)

(72) Inventors: Michael P. Wagner, Raleigh, NC (US); Alan L. Taylor, Cary, NC (US); Dave W. Harvey, Newton, MA (US); Dean A. Herington, Hillsborough, NC (US)

(73) Assignee: EMC Corporation, Hopkinton, MA (US)

( * ) Notice: Subject to any disclaimer, the term of this patent is extended or adjusted under 35 U.S.C. 154(b) by 158 days.

(21) Appl. No.: 14/042,273

(22) Filed: Sep. 30, 2013

(51) Int. Cl.
G06F 11/00 (2006.01)
G06F 11/07 (2006.01)

(52) U.S. Cl.
CPC .................. G06F 11/0727 (2013.01)

(58) Field of Classification Search
CPC ............ G06F 11/0727; G06F 11/0793; G06F 11/1076; G06F 11/2092
USPC ........................................ 714/5.11
See application file for complete search history.

(56) References Cited

U.S. PATENT DOCUMENTS 9,122,787 B2 * 9/2015 Arakawa ............. G06F 11/1088
2009/0055679 A1 * 2/2009 Langford et al. ................ 714/4

* cited by examiner

*Primary Examiner* — Yair Leibovich
(74) *Attorney, Agent, or Firm* — Brian J. Colandreo; Mark H. Whittenberger; Holland & Knight LLP

(57) ABSTRACT

A method, computer program product, and computing system for receiving, on a first storage processor, a configuration IO request concerning a data array coupled to the first storage processor. The configuration IO request is provided to the data array for execution. A failure indication that the configuration IO request failed to execute is received. In response to receiving the failure indication, a status indicator is determined for a second storage processor coupled to the data array. Whether to reset the first storage processor is determined based, at least in part, upon the status indicator of the second storage processor.

21 Claims, 3 Drawing Sheets

SYSTEM AND METHOD FOR STORAGE MANAGEMENT

TECHNICAL FIELD

This disclosure relates to storage systems and, more particularly, to systems and methods for managing storage processors.

BACKGROUND

Storing and safeguarding electronic content is of paramount importance in modern business. Accordingly, various systems may be employed to protect such electronic content.

The use of high-availability data arrays is increasing in popularity, wherein each data array may be configured to serve a plurality of hosts (e.g., storage processors). These hosts may be configured in a redundant fashion, in which multiple hosts service a single data array.

SUMMARY OF DISCLOSURE

In one implementation, a computer-implemented method includes receiving, on a first storage processor, a configuration input-output (hereinafter referred to as "IO") request concerning a data array coupled to the first storage processor. The configuration IO request is provided to the data array for execution. A failure indication that the configuration IO request failed to execute is received. In response to receiving the failure indication, a status indicator is determined for a second storage processor coupled to the data array. Whether to reset the first storage processor is determined based, at least in part, upon the status indicator of the second storage processor.

One or more of the following features may be included. The failure indication may include the expiry of an inquiry clock. The first storage processor and the second storage processor may be configured in an active-active arrangement. The configuration IO request may define one or more LUNs for the data array. In response to an in-service status indicator for the second storage processor, the resetting of the first storage processor may be initiated. In response to an out-of-service status indicator for the second storage processor, the resetting of the first storage processor may be delayed. The out-of-service status indicator may indicate that the second storage processor: is offline, is currently being reset, or is preparing to be reset.

In another implementation, a computer program product resides on a computer readable medium and has a plurality of instructions stored on it. When executed by a processor, the instructions cause the processor to perform operations including receiving, on a first storage processor, a configuration IO request concerning a data array coupled to the first storage processor. The configuration IO request is provided to the data array for execution. A failure indication that the configuration IO request failed to execute is received. In response to receiving the failure indication, a status indicator is determined for a second storage processor coupled to the data array. Whether to reset the first storage processor is determined based, at least in part, upon the status indicator of the second storage processor.

One or more of the following features may be included. The failure indication may include the expiry of an inquiry clock. The first storage processor and the second storage processor may be configured in an active-active arrangement. The configuration IO request may define one or more LUNs for the data array. In response to an in-service status indicator for the second storage processor, the resetting of the first storage processor may be initiated. In response to an out-of-service status indicator for the second storage processor, the resetting of the first storage processor may be delayed. The out-of-service status indicator may indicate that the second storage processor: is offline, is currently being reset, or is preparing to be reset.

In another implementation, a computing system including a processor and memory is configured to perform operations including receiving, on a first storage processor, a configuration IO request concerning a data array coupled to the first storage processor. The configuration IO request is provided to the data array for execution. A failure indication that the configuration IO request failed to execute is received. In response to receiving the failure indication, a status indicator is determined for a second storage processor coupled to the data array. Whether to reset the first storage processor is determined based, at least in part, upon the status indicator of the second storage processor.

One or more of the following features may be included. The failure indication may include the expiry of an inquiry clock. The first storage processor and the second storage processor may be configured in an active-active arrangement. The configuration IO request may define one or more LUNs for the data array. In response to an in-service status indicator for the second storage processor, the resetting of the first storage processor may be initiated. In response to an out-of-service status indicator for the second storage processor, the resetting of the first storage processor may be delayed. The out-of-service status indicator may indicate that the second storage processor: is offline, is currently being reset, or is preparing to be reset.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview

Figure 1:
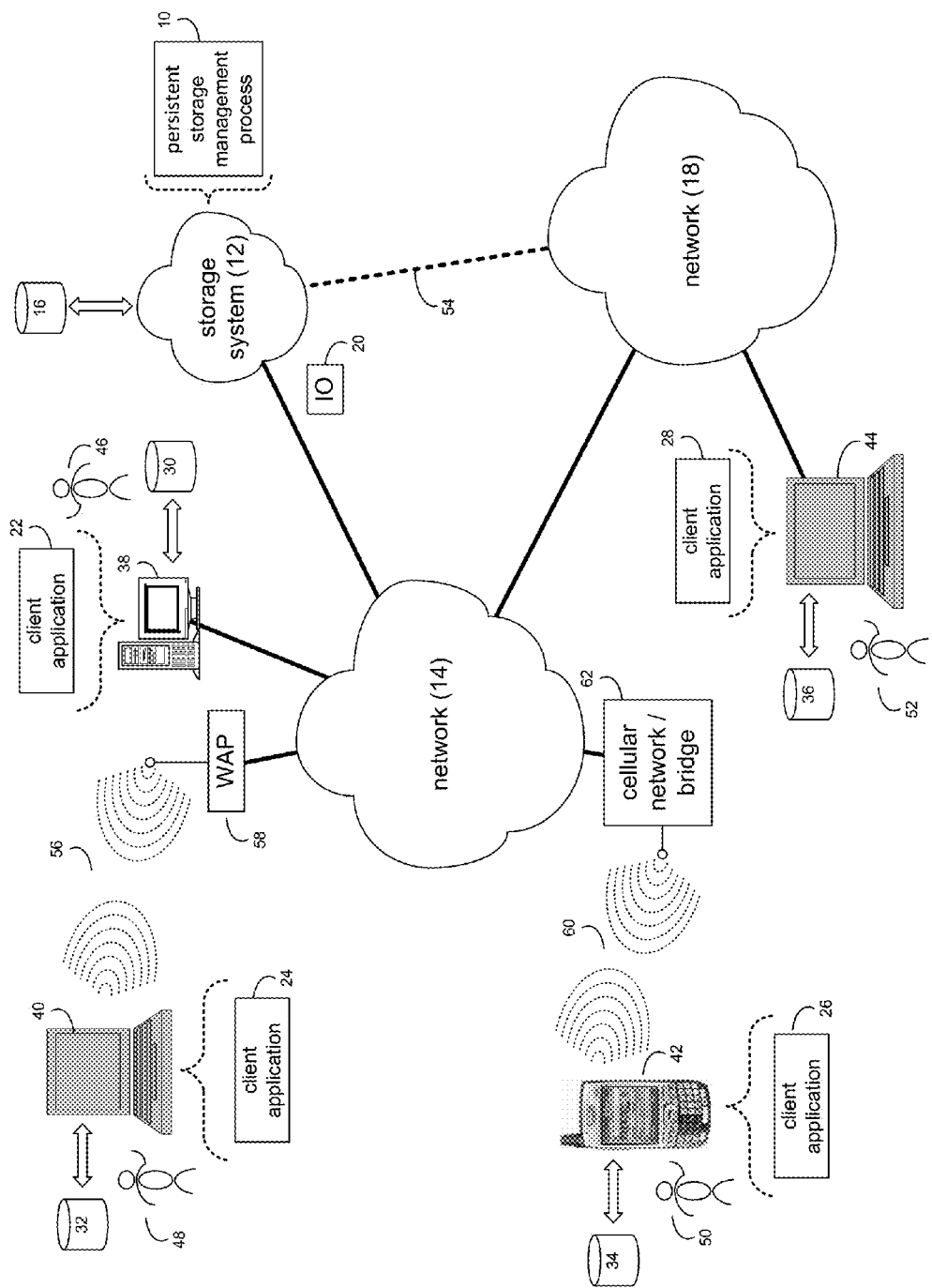
FIG. 1 is a diagrammatic view of a storage system and a persistent storage management process coupled to a distributed computing network.

Referring to FIG. 1, there is shown persistent storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows XP Server™; Novell Netware™; Redhat Linux™ Unix, or a custom operating system, for example.

The instruction sets and subroutines of persistent storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

Client electronic devices 38, 40, 42, 44 may each execute an operating system, examples of which may include but are not limited to Microsoft Windows™, Microsoft Windows CE™, Redhat Linux™, or a custom operating system.

For illustrative purposes, storage system 12 will be described as being a network-based storage system that includes a plurality of electro-mechanical backend storage devices. However, this is for illustrative purposes only and is not intended to be a limitation of this disclosure, as other configurations are possible and are considered to be within the scope of this disclosure. For example and as discussed above, storage system 12 may be a personal computer that includes a single electro-mechanical storage device.

Figure 2:
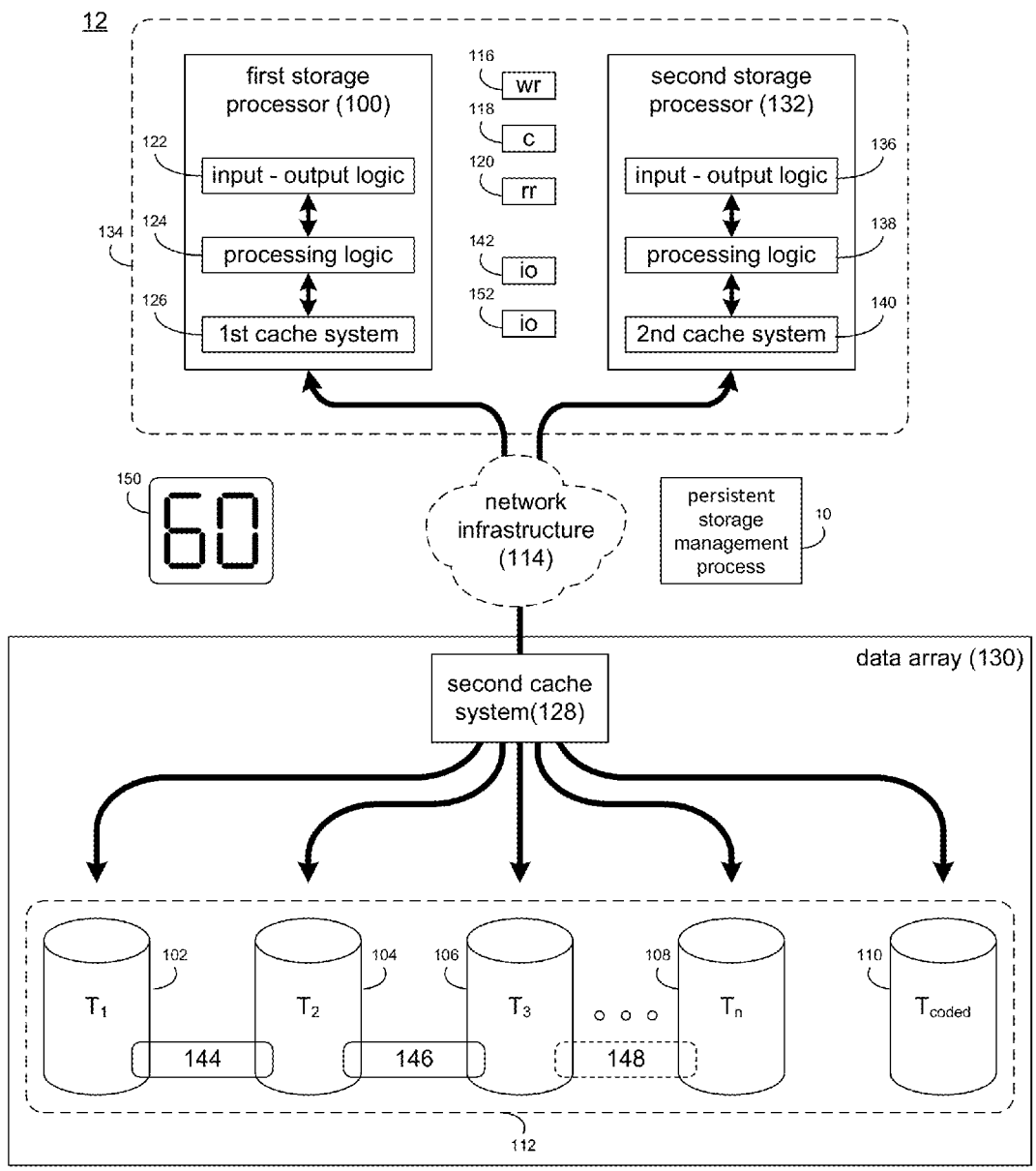
FIG. 2 is a diagrammatic view of the storage system of FIG. 1.

Referring also to FIG. 2, storage system 12 may include first storage processor 100 and a plurality of storage targets $T_{1-n}$ (e.g. storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for illustrative purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for illustrative purposes only and is not intended to be a limitation of this disclosure. Specifically, the actual number of storage targets may be increased or decreased depending upon e.g. the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for illustrative purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives, wherein a combination of storage targets 102, 104, 106, 108 and coded target 110 may form non-volatile, electro-mechanical memory system 112.

The manner in which storage system 12 is implemented may vary depending upon e.g. the level of redundancy/performance/capacity required. For example, storage system 12 may be a RAID device in which active storage processor 100 is a RAID controller card and storage targets 102, 104, 106, 108 and/or coded target 110 are individual "hot-swappable" hard disk drives. An example of such a RAID device may include but is not limited to an NAS device. Alternatively, storage system 12 may be configured as a SAN, in which active storage processor 100 may be e.g., a server computer and each of storage targets 102, 104, 106, 108 and/or coded target 110 may be a RAID device and/or computer-based hard disk drive. Further still, one or more of storage targets 102, 104, 106, 108 and/or coded target 110 may be a SAN.

In the event that storage system 12 is configured as a SAN, the various components of storage system 12 (e.g. active storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of persistent storage management process 10. The instruction sets and subroutines of persistent storage management process 10, which may be stored on a storage device (e.g., storage device 16) coupled to first storage processor 100, may be executed by one or more processors (not shown) and one or more memory architectures (not shown) included within first storage processor 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when first storage processor 100 is configured as an application server, these IO requests may be internally generated within first storage processor 100. Examples of IO request 20 may include but are not limited to data write request 116 (i.e. a request that content 118 be written to storage system 12) and data read request 120 (i.e. a request that content 118 be read from storage system 12).

First storage processor 100 may include input-output logic 122 (e.g., a network interface card or a Host Bus Adaptor (HBA)), processing logic 124, and first cache system 126. Examples of first cache system 126 may include but are not limited to a volatile, solid-state, cache memory system (e.g., a dynamic RAM cache memory system) and/or a non-volatile, solid-state, cache memory system (e.g., a flash-based, cache memory system).

During operation of first storage processor 100, content 118 to be written to storage system 12 may be received by input-output logic 122 (e.g. from network 14 and/or network 18) and processed by processing logic 124. Additionally/alternatively and when active storage processor 100 is configured as an application server, content 118 to be written to storage system 12 may be internally generated by active storage processor 100. As will be discussed below in greater detail, processing logic 124 may initially store content 118 within first cache system 126.

Depending on the manner in which first cache system 126 is configured, processing logic 124 may immediately write content 118 to second cache system 128/non-volatile, electromechanical memory system 112 (if first cache system 126 is configured as a write-through cache) or may subsequently write content 118 to second cache system 128/non-volatile, electro-mechanical memory system 112 (if first cache system 126 is configured as a write-back cache). Additionally and in certain configurations, processing logic 124 may calculate and store coded data on coded target 110 (included within non-volatile, electromechanical memory system 112) that may allow for the regeneration of data lost/corrupted on one or more of storage targets 102, 104, 106, 108. For example, if processing logic 124 was included within a RAID controller card or an NAS/SAN controller, processing logic 124 may calculate and store coded data on coded target 110. However, if processing logic 124 was included within e.g., an applications server, data array 130 may calculate and store coded data on coded target 110.

Examples of second cache system 128 may include but are not limited to a volatile, solid-state, cache memory system (e.g., a dynamic RAM cache memory system) and/or a non-volatile, solid-state, cache memory system (e.g., a flash-based, cache memory system).

The combination of second cache system 128 and non-volatile, electromechanical memory system 112 may form data array 130, wherein first cache system 126 may be sized so that the number of times that data array 130 is accessed may be reduced. Accordingly, by sizing first cache system 126 so that first cache system 126 retains a quantity of data sufficient to satisfy a significant quantity of IO requests (e.g., IO request 20), the overall performance of storage system 12 may be enhanced.

Further, second cache system 128 within data array 130 may be sized so that the number of times that non-volatile, electromechanical memory system 112 is accessed may be reduced. Accordingly, by sizing second cache system 128 so that second cache system 128 retains a quantity of data sufficient to satisfy a significant quantity of IO requests (e.g., IO request 20), the overall performance of storage system 12 may be enhanced.

As discussed above, the instruction sets and subroutines of persistent storage management process 10, which may be stored on storage device 16 included within storage system 12, may be executed by one or more processors (not shown) and one or more memory architectures (not shown) included within storage system 12. Accordingly, in addition to being executed on active storage processor 100, some or all of the instruction sets and subroutines of persistent storage management process 10 may be executed by one or more processors (not shown) and one or more memory architectures (not shown) included within data array 130.

The Persistent Storage Management Process:

Assume for the following example that first storage processor 100 and a second storage processor (e.g., second storage processor 132) are included within cluster 134, wherein both first storage processor 100 and second storage processor 132 are coupled to data array 130. First storage processor 100 and second storage processor 132 may be configured in an active-active arrangement, wherein both first storage processor 100 and second storage processor 132 may simultaneously service data array 130 (as opposed to one of the storage processors assuming a passive role that stays in standby mode until assuming the active role).

For the following discussion, first storage processor 100 and second storage processor 132 are going to be described as being coupled to a single data array (namely data array 130). This, however, is for illustrative purposes only and is not intended to be a limitation of this disclosure, as other configurations are possible and are considered to be within the scope of this disclosure. For example, first storage processor 100 and second storage processor 132 may be coupled to one or more additional data arrays (not shown). Accordingly, persistent storage management process 10 may be executed for each individual data array to which first storage processor 100 and second storage processor 132 are coupled.

Second storage processor 132 may include input-output logic 136 (e.g., a network interface card or a Host Bus Adaptor (HBA)), processing logic 138, and second cache system 140. Examples of second cache system 140 may include but are not limited to a volatile, solid-state, cache memory system (e.g., a dynamic RAM cache memory system) and/or a non-volatile, solid-state, cache memory system (e.g., a flash-based, cache memory system). The instruction sets and subroutines of persistent storage management process 10 may also be executed by one or more processors (not shown) and one or more memory architectures (not shown) included within second storage processor 132.

Configuration IO requests (e.g., configuration IO request 142) may be processed by storage system 12 to configure data array 130. For example, data array 130 may be configured to include one or more LUNs (i.e., logical drives) that may be utilized by individuals/groups of individuals to store data. Therefore, a first portion (e.g., LUN 144) of data array 130 may be defined (via a configuration IO request) and assigned to user 46 for storing data onto data array 130; and a second portion (e.g., LUN 146) of data array 130 may be defined (via a configuration IO request) and assigned to user 48 for storing data on data array 130.

Figure 3:
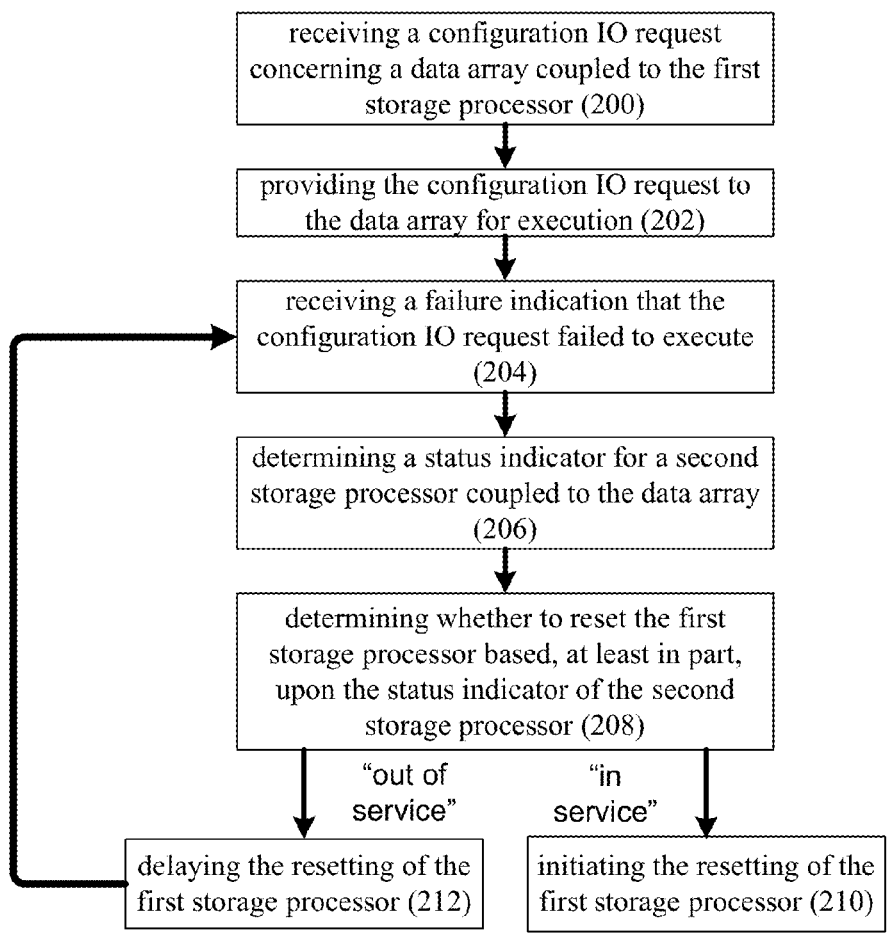
FIG. 3 is a flow chart of one implementation of the persistent storage management process of FIG. 1.

Referring also to FIG. 3, persistent storage management process 10 may receive 200, on a first storage processor (e.g., first storage processor 100), a configuration IO request (e.g., configuration IO request 142) concerning a data array (e.g., data array 130) coupled to the first storage processor (e.g., first storage processor 100). Assume for this example that configuration IO request 142 concerns a request that a new LUN (e.g., LUN 148) be defined within data array 130 for user 52.

Upon receiving configuration IO request 142, persistent storage management process 10 may notify second storage processor 132 of the receipt 200 of configuration IO request 142 by first storage processor 100. Persistent storage management process 10 may provide 202 configuration IO request 142 to data array 130 for execution so that LUN 148 may be established within data array 130 for user 52.

At the time that configuration IO request 142 is provided 202 to data array 130 for execution, persistent storage management process 10 may set an inquiry clock (e.g., inquiry clock 160) that may be used to define a deadline for the execution of configuration IO request 142. For example, persistent storage management process 10 may set inquiry clock 160 to sixty seconds, wherein inquiry clock 160 may be configured to begin counting down to zero from sixty (or begin counting up to sixty from zero) once configuration IO request 142 is provided 202 to data array 130 for execution. Accordingly and in this example, persistent storage management process 10 may provide data array 130 with a sixty-second time limit for completing the execution of configuration IO request 142.

In the event that configuration IO request 142 is processed within this sixty-second time limit, LUN 148 may be established within data array 130 for user 52. However, in the event that configuration IO request 142 fails to be executed within this sixty-second time limit, persistent storage management process 10 may receive 204 a failure indication that configuration IO request 142 failed to execute in a timely fashion. An example of such a failure indication may include but is not limited to the expiry of inquiry clock 160. Accordingly, when persistent storage management process 10 provides 202 configuration IO request 142 to data array 130 and sets inquiry clock 160 to (in this example) sixty seconds, persistent storage management process 10 may wait for configuration IO request 142 to be fully executed and e.g., LUN 148 to be established within data array 130 for user 52. However, in the event that configuration IO request 142 is not fully executed prior to the expiry of inquiry clock 160, persistent storage management process 10 may interpret the expiry of inquiry clock 160 as a failure indication that configuration IO request 142 failed to execute.

In response to receiving 204 the failure indication (e.g., the expiry of inquiry clock 160), persistent storage management process 10 may determine 206 a status indicator for second storage processor 132 coupled to data array 130. For example, persistent storage management process 10 may determine whether second storage processor 132 is currently functioning properly. As discussed above, first storage processor 100 and second storage processor 132 may be configured in an active-active arrangement, wherein both first storage processor 100 and second storage processor 132 may simultaneously service data array 130 (as opposed to one of the storage processors assuming a passive role that stays in standby mode until assuming the active role). Accordingly, while first storage processor 100 is processing configuration IO request 142, second storage processor 132 may be processing another configuration IO request (e.g., configuration IO request 152).

Upon receiving such an inquiry, second storage processor 132 may provide the above-described status indicator, wherein this status indicator may generally define the status of second storage process 132 as being: a) "Offline"; b) "Currently being Reset"; c) "Preparing to be Reset"; or d) "In-Service".

"Offline" Status:

May be indicative that second storage processor 132 is not responding to a status inquiry. For example, if second storage processor 132 has experienced a complete failure, second storage processor 132 may not respond to the status inquiry from persistent storage management process 10 and persistent storage management process 10 may deem the status of second storage processor 132 as "Offline".

"Currently Being Reset" Status:

May be indicative that second storage processor 132 is currently in the process of resetting (e.g., rebooting) itself. For example, if second storage processor 132 has experienced a problem, second storage processor 132 may have reset itself and is currently in the process of rebooting. Accordingly, persistent storage management process 10 may deem the status of second storage processor 132 as "Currently being Reset".

"Preparing to Reset" Status:

May be indicative that second storage processor 132 is preparing to reset (e.g., reboot) itself. For example, if second storage processor 132 has experienced a problem, second storage processor 132 may have determined that it needs to reset itself and, therefore, will be resetting (e.g., rebooting) itself shortly. Accordingly, persistent storage management process 10 may deem the status of second storage processor 132 as "Preparing to Reset".

"In-Service" Status:

May be indicative that second storage processor 132 is operating properly. For example, second storage processor 132 is not experiencing any problems. Accordingly, persistent storage management process 10 may deem the status of second storage processor 132 as "In Service".

Generally, when persistent storage management process 10 determines the status of second storage processor 132 to be a) "Offline"; b) "Currently being Reset"; or c) "Preparing to be Reset", persistent storage management process 10 may consider second storage processor 132 to be Out-of-Service, versus when persistent storage management process 10 determines that second storage processor 132 is "In-Service".

Since persistent storage management process 10 received 204 the above-described failure indication concerning configuration IO request 142, persistent storage management process 10 may wish to reset first storage processor 100. However, persistent storage management process 10 may determine 208 whether to reset first storage processor 100 based, at least in part, upon the status indicator of second storage processor 132.

For example and in response to an "In-Service" status indicator concerning second storage processor 132, persistent storage management process 10 may initiate 210 the resetting of first storage processor 100.

Conversely and in response to an "Out-of-Service" status indicator (e.g., an "Offline" status indicator, a "Currently being Reset" status indicator, or a "Preparing to be Reset" status indicator) concerning second storage processor 132, persistent storage management process 10 may delay 212 the resetting of first storage processor 100 until the status of second storage processor 132 transitions to "In-Service".

Accordingly and in response to receiving such an "Out-of-Service" status indicator concerning second storage processor 132, persistent storage management process 10 may reset inquiry clock 150 (e.g., for another sixty seconds). If, during the second sixty second inquiry clock, data array 130 fully executes configuration IO request 142, the need to reset first storage process 100 may be eliminated. If, during the second sixty second inquiry clock, data array 130 does not fully execute configuration IO request 142, persistent storage management process 10 may once again determine 206 a status indicator for second storage processor 132 coupled to data array 130 and may once again utilize this status indicator to determine 208 whether to reset first storage processor 100 (based, at least in part, upon the status indicator of second storage processor 132).

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
    receiving, on a first storage processor, a configuration input-output request concerning a data array coupled to the first storage processor;
    providing the configuration input-output request to the data array for execution;
    receiving a failure indication that the configuration input-output request failed to execute;
    in response to receiving the failure indication, determining a status indicator for a second storage processor coupled to the data array; and
    determining whether to reset the first storage processor based, at least in part, upon the status indicator of the second storage processor.

2. The computer-implemented method of claim 1 wherein the failure indication includes the expiry of an inquiry clock.

3. The computer-implemented method of claim 1 wherein the first storage processor and the second storage processor are configured in an active-active arrangement.

4. The computer-implemented method of claim 1 wherein the configuration input-output request defines one or more LUNs for the data array.

5. The computer-implemented method of claim 1 further comprising:
    in response to an in-service status indicator for the second storage processor, initiating the resetting of the first storage processor.

6. The computer-implemented method of claim 1 further comprising:
    in response to an out-of-service status indicator for the second storage processor, delaying the resetting of the first storage processor.

7. The computer-implemented method of claim 6 wherein the out-of-service status indicator indicates that the second storage processor: is offline, is currently being reset, or is preparing to be reset.

8. A computer program product residing on a non-transitory computer readable medium having a plurality of instructions stored thereon which, when executed by a processor, cause the processor to perform operations comprising:
    receiving, on a first storage processor, a configuration input-output request concerning a data array coupled to the first storage processor;
    providing the configuration input-output request to the data array for execution;
    receiving a failure indication that the configuration input-output request failed to execute;
    in response to receiving the failure indication, determining a status indicator for a second storage processor coupled to the data array; and
    determining whether to reset the first storage processor based, at least in part, upon the status indicator of the second storage processor.

9. The computer program product of claim 8 wherein the failure indication includes the expiry of an inquiry clock.

10. The computer program product of claim 8 wherein the first storage processor and the second storage processor are configured in an active-active arrangement.

11. The computer program product of claim 8 wherein the configuration input-output request defines one or more LUNs for the data array.

12. The computer program product of claim 8 further comprising instructions for:
    in response to an in-service status indicator for the second storage processor, initiating the resetting of the first storage processor.

13. The computer program product of claim 8 further comprising instructions for:
    in response to an out-of-service status indicator for the second storage processor, delaying the resetting of the first storage processor.

14. The computer program product of claim 13 wherein the out-of-service status indicator indicates that the second storage processor: is offline, is currently being reset, or is preparing to be reset.

15. A computing system including a hardware processor and memory configured to perform operations comprising:
    receiving, on a first storage processor, a configuration input-output request concerning a data array coupled to the first storage processor;
    providing the configuration input-output request to the data array for execution;
    receiving a failure indication that the configuration input-output request failed to execute;
    in response to receiving the failure indication, determining a status indicator for a second storage processor coupled to the data array; and
    determining whether to reset the first storage processor based, at least in part, upon the status indicator of the second storage processor.

16. The computing system of claim 15 wherein the failure indication includes the expiry of an inquiry clock.

17. The computing system of claim 15 wherein the first storage processor and the second storage processor are configured in an active-active arrangement.

18. The computing system of claim 15 wherein the configuration input-output request defines one or more LUNs located on the data array.

19. The computing system of claim 15 further configured to perform operations comprising:
   in response to an in-service status indicator for the second storage processor, initiating the resetting of the first storage processor.

20. The computing system of claim 15 further configured to perform operations comprising:
   in response to an out-of-service status indicator for the second storage processor, delaying the resetting of the first storage processor.

21. The computing system of claim 20 wherein the out-of-service status indicator indicates that the second storage processor: is offline, is currently being reset, or is preparing to be reset.

* * * * *